Sept. 20, 1960 C. U. HARTLE ET AL 2,952,930

MEANS FOR TRANSMITTING TICKETS BY FACSIMILE

Filed March 28, 1957 2 Sheets-Sheet 1

INVENTORS
C. U. HARTLE
W. F. MOORE

BY [signature]

ATTORNEY

Sept. 20, 1960 C. U. HARTLE ET AL 2,952,930

MEANS FOR TRANSMITTING TICKETS BY FACSIMILE

Filed March 28, 1957 2 Sheets-Sheet 2

INVENTORS
C. U. HARTLE
W. F. MOORE
BY
[signature]
ATTORNEY

United States Patent Office 2,952,930

Patented Sept. 20, 1960

2,952,930

MEANS FOR TRANSMITTING TICKETS BY FACSIMILE

Cloyd U. Hartle, Clifton, and William F. Moore, Passaic, N.J., assignors to The Western Union Telegraph Company, New York, N.Y., a corporation of New York Filed Mar. 28, 1957, Ser. No. 649,096

2 Claims. (Cl. 40—10)

This invention relates to a method of transmitting tickets or the like by means of a facsimile transmitter at an office, for example, at a ticket reservation center, for effecting their delivery and issuance by means of a facsimile recorder located at a distant point, for example, in a customer's office, generally in response to requests for tickets or reservations.

The instant invention obviates the delay and trouble commonly encountered when a business firm wishes to obtain tickets or reservations, for example, train tickets and reservations for its personnel. Heretofore it has generally been necessary for the customer first to ascertain from the railroad reservation office whether one or more units of space are available on a certain train on a particular date. If the desired space is available, reservations may be entered by the railroad in the name of the customer, but it is then necessary for the customer to send an employee to a ticket window at the reservation office to buy the reserved space and pick up the tickets. This results in substantial loss of time which is incurred by travel of an employee to the ticket office and return and also the time frequently lost while waiting in line at a ticket reservation window.

Some railroads have now established a service which permits the transmission of completed railroad and/or Pullman tickets by facsimile methods to customers having facsimile machines in their offices. It will be appreciated, however, that it is difficult for the reservation office to transmit the facsimile signals from a relatively small ticket form on available facsimile equipment which is adapted to accommodate much larger copy sheets, for example, a transmitter-recorder of the type in general use and known to the public by the trademark "Deskfax."

It is an object of the instant invention to facilitate the transmission of facsimile signals of tickets to a customer by means of conventional interconnected facsimile machines, by providing a composite facsimile transmitting blank for use by the reservation office, which blank comprises the combination of a transmitting sheet of a suitable size and configuration for insertion in a conventional facsimile transmitter or transceiver, which sheet has a plurality of slits formed therein, and a master ticket form or coupon having the necessary data thereon removably disposed in the slits in a manner to locate and hold the ticket form in the proper position for the transmission of the ticket facsimile signals. The arrangement also enables certain other information to be transmitted by the transmitting sheet in addition to the data appearing on the master ticket form, and the ticket form is held in such position relative to the information appearing on the transmitting sheet as to cause the data on the ticket form and the information on the transmitting sheet to be disposed in tabular form, whereby the signals transmitted from the composite blank may be recorded at the customer's office on a recording blank of a type that may readily be divided into a plurality of separable parts each containing a complete item of transmitted information. This enables the transmitted ticket to be received at the customer's office on a perforated sheet of electrosensitive recording paper and which in the case of railroad tickets comprises a 3-part validated ticket including the conductor's and passenger's copies and one for the customer's auditor.

Illustrative embodiments of the invention are depicted in the accompanying drawing in which.

Figure 1:
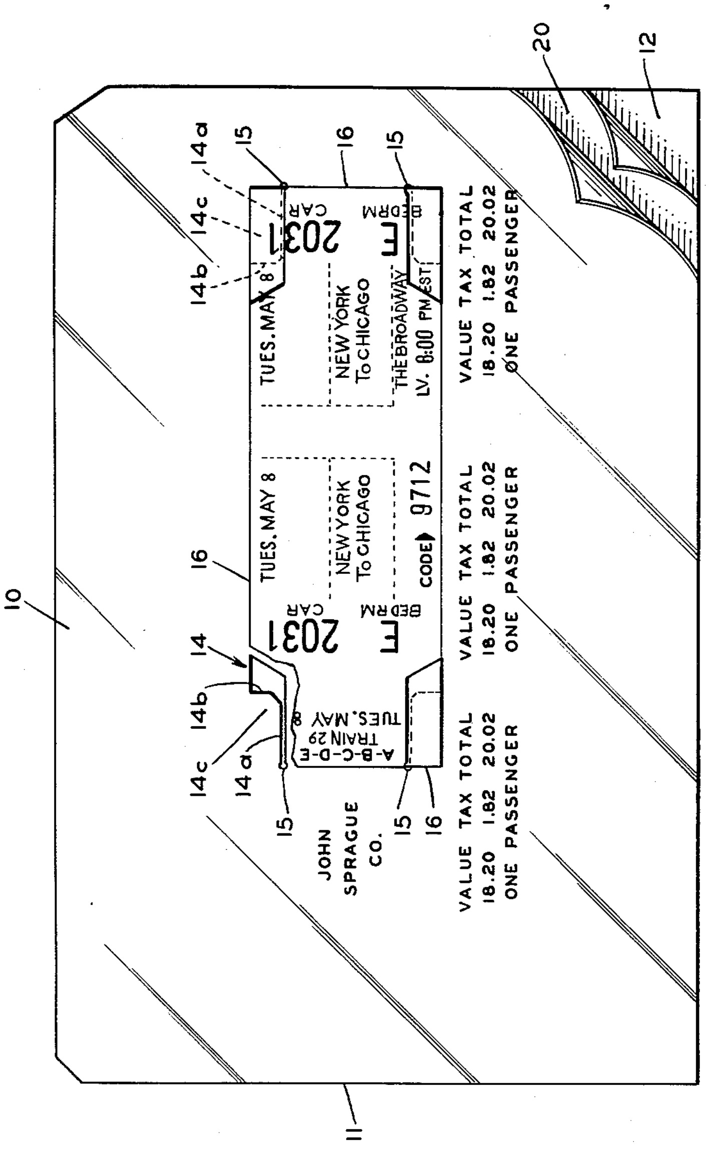
Fig. 1 is a view of a composite transmission blank embodying the principles of the invention.

In the preferred embodiment of the invention, as shown in Fig. 1, the composite transmitting blank includes a rectangular transparent sheet which has been folded in half along the line 11 to provide a top sheet 10 overlying a bottom sheet 12, the folder being of a size and configuration adapted for insertion in a conventional facsimile transmitter or transceiver, for example, of the type in which the transmission blank is fastened around a transmitting and recording drum, as in a comparatively small office type transceiver known in the trade under the trademark "Deskfax." In such a machine the drum is rotated at a suitable constant speed and when used as a transmitter a pickup photocell is advanced longitudinally along the drum by means of a traveling carriage at the proper rate to effect helical scanning of a transmitting blank and produce facsimile signals in known manner. It will also be understood that a flat bed type of facsimile machine may be employed instead of a drum type machine. The transparent folder above mentioned may be formed from a relatively tough plastic sheet of suitable thickness, such as cellulose acetate, aceto-butyrate and various vinyl copolymers, although preferably the sheet is a polyester film made from polyethylene terethalate obtainable under the trademark "MYLAR."

The upper sheet 10 of the folder has four specially arranged cuts or slots 14 punched or otherwise formed therein, and a pasteboard ticket form or coupon 16 may readily be inserted from the underside of the top sheet 10 with the four corners of the ticket form being inserted in the slots 14. The ticket form 16, which is a master ticket or coupon kept in the files of the reservation office, is thus securely held in proper position by the sheet 10, and the ends of the coupon are prevented from projecting upwardly when the folder is wrapped around the drum of the facsimile machine for transmission.

The preprinted data appearing on the master ticket form or coupon will, in the case of Pullman tickets, usually comprise the train number and date of departure, the car number, the names of the cities representing the boarding and destination points, the particular category of reserved space, e.g., a Bedroom, a letter or other character that identifies a particular bedroom in the car, and the hour of departure. As hereinbefore stated, it is desired to transmit additional information to be recorded on the electrosensitive ticket form at the facsimile recorder, which information may comprise the price of the ticket and the tax thereon, and also a legend indicating the number of passengers to occupy the space, and the name or identification of the firm or other customer in order that the ticket may be charged to be proper account. This additional information may be printed on the upper sheet 10 or it may be printed on an oqaque sheet 20 inserted within the folder, or if desired a portion of the information may be printed on each sheet, in which latter case the sheet 20 is of contrasting color to the information delineated on the transparent sheet 12. Preferably, the customer's firm name is printed on the intermediate sheet 20, and the information comprising the price, tax and notation in regard to the number of passengers is printed on the upper sheet 10 of the folder, so that one sheet 20 will serve for use with tickets of various prices for a particular customer.

Figure 3:
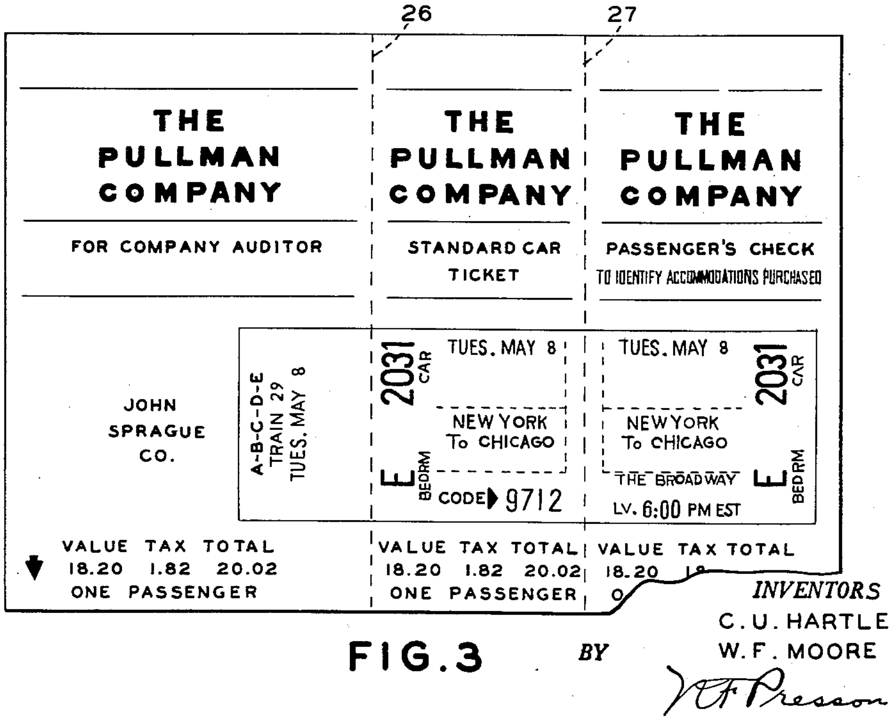
Fig. 3 is a view of a 3-part validated ticket resulting from the transmission of signals from the transmitting blank of either Fig. 1 or Fig. 2.

As seen in Fig. 1, the additional information in regard to the price and number of passengers may be repeated and arranged in tabular form so that the signals transmitted from the transmission blank may be reproduced serially on the validated ticket form 24, Fig. 3, which ticket form is divided into three severable parts each with this information thereon. Line tear-off perforations 26, 27 in the ticket form are provided to facilitate separation of the three parts respectively for the customer's auditor, the conductor on the train on which the ticket is used, and the passenger's copy or check. Any of various suitable types of electrosensitive facsimile recording paper may be employed for the ticket form, although preferably the recording paper is of the type disclosed in the U.S. patent to Kline, No. 2,528,005, issued October 31, 1950, in which the electrosensitive facsimile coating is composed of cuprous thiocyanate. The name "The Pullman Company" and the identifications of the three separable parts are preprinted on the ticket form, as shown in the figure.

In the upper left hand portion of Fig. 1 a portion of the corner of the master ticket 16 is broken away in order to show more clearly that each slot 14 comprises a narrow slit 14*a* which terminates in an opening 14*b*. This facilitates the insertion of the corners of the ticket into the slots, and the portion 14*c* of the sheet provides a backing for the corners of the inserted ticket. Small round holes 15 are punched in the sheet to prevent tearing at the outer ends of the slits 14*a*.

Figure 2:
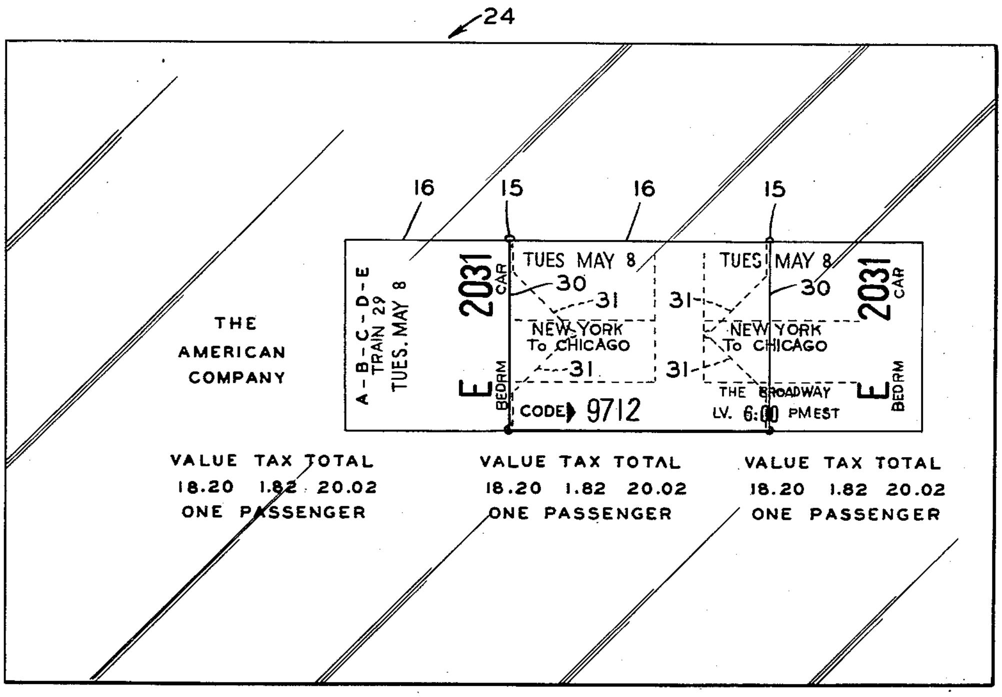
Fig. 2 is a view of a similar transmission blank, with a different arrangement for holding the master ticket form.

Fig. 2 of the drawings shows a transmission blank generally in accordance with the blank of Fig. 1, except that the top sheet 10' of the folder has two narrow slots or slits 30 cut therein and the master ticket may be bowed upwardly and the ends of the ticket be inserted from the top of the sheet, the ends being prevented from projecting from the folder by the sheet 10 when wrapped around the facsimile transmitter, the slits serving to hold the master ticket in proper position during a scanning operation. The web portion of the sheet intermediate the slots has triangular cutout portions 31 to facilitate the insertion of the ticket 16.

While preferably the transmission blank comprises a folder of transparent material, it will be understood that a master ticket form or coupon may be mounted in slits or slots formed in a single sheet of opaque material to comprise a transmission blank, and in such case the additional information hereinbefore referred to would be printed on the single sheet, for example, like the sheet 20 have slots formed therein.

While the invention has been explained primarily with reference to railroad reservation service, it will be appreciated that the invention is also applicable to the facsimile transmission and issuance of tickets, coupons and the like for theatres, sporting events, and other purposes, including bank or other business forms of a size smaller than the usual facsimile blank. For brevity in the claims the word "ticket" is employed in a generic sense to include a ticket, coupon, check, small business form or the like. Various modifications of the structure illustrated herein may occur to those versed in the art without departing from the spirit of the instant invention which is, therefore, not to be regarded as limited except as indicated by the scope of the appended claims.

What is claimed is:

1. A composite facsimile transmission blank for use with a facsimile machine for transmitting signals for recording on an electrosensitive ticket form having detachable portions connected by line tear-off perforations, comprising a two-sheet folder having at least the upper sheet thereof formed from transparent material, said folder having a size and configuration such that it may be inserted in a facsimile transmitter, an opaque sheet removably contained between the sheets of said folder and having one type of information delineated thereon and scannable through the upper transparent sheet of the folder, said upper sheet having a plurality of slots formed therein, and an opaque ticket having further information delineated thereon and removably disposed in said slots in a manner to locate and hold said ticket in such position that said further information delineated thereon and said information delineated on the contained opaque sheet are presented in predetermined juxtaposition to insure that the transmitted information as recorded is properly located with respect to said line tear-off perforations in the validated ticket form.

2. A composite facsimile transmission blank for use with a drum type facsimile machine for transmitting signals for recording on an electrosensitive ticket form having detachable portions connected by line tear-off perforations, comprising a two-sheet folder formed from a flexible transparent plastic material, said folder having a size and configuration such that it may be wrapped around a facsimile transmitting drum, an opaque sheet removably contained between the sheets of said folder and having one type of information delineated thereon and scannable through the upper transparent sheet of the folder, said upper sheet having a plurality of slots formed therein, and an opaque ticket having further information delineated thereon and removably disposed in said slots in a manner to cause the ticket to conform to the curvature of the transmitting drum and to locate and hold the ticket in such position that said further information delineated thereon and said information delineated on the contained opaque sheet are presented in predetermined juxtaposition to insure that the transmitted information as recorded is properly located with respect to said line tear-off perforations in the ticket form.

References Cited in the file of this patent

UNITED STATES PATENTS

| | | |
|---|---|---|
| 1,210,215 | Satterlee | Dec. 26, 1916 |
| 1,220,354 | Lodge | Mar. 27, 1917 |
| 1,906,311 | Burgstaller | May 2, 1933 |
| 2,016,176 | Rand | Oct. 1, 1935 |
| 2,084,579 | Edwards | June 22, 1937 |
| 2,110,709 | Limbach | Mar. 8, 1938 |
| 2,283,026 | Yates | May 12, 1942 |
| 2,538,927 | Truitt | Jan. 23, 1951 |
| 2,556,825 | Smith | June 12, 1951 |